US011398019B2

(12) United States Patent
Wu et al.

(10) Patent No.: US 11,398,019 B2
(45) Date of Patent: Jul. 26, 2022

(54) LIGHT FIELD SYSTEM OCCLUSION REMOVAL

(71) Applicant: SHANGHAITECH UNIVERSITY, Shanghai (CN)

(72) Inventors: Minye Wu, Shanghai (CN); Zhiru Shi, Shanghai (CN)

(73) Assignee: ShanghaiTech University, Shanghai (CN)

( * ) Notice: Subject to any disclaimer, the term of this patent is extended or adjusted under 35 U.S.C. 154(b) by 0 days.

(21) Appl. No.: 17/072,397

(22) Filed: Oct. 16, 2020

(65) Prior Publication Data

US 2021/0042898 A1 Feb. 11, 2021

Related U.S. Application Data

(63) Continuation of application No. PCT/CN2019/091346, filed on Jun. 14, 2019, which
(Continued)

(51) Int. Cl.
*G06T 5/50* (2006.01)
*G06T 7/80* (2017.01)
(Continued)

(52) U.S. Cl.
CPC .............. *G06T 5/50* (2013.01); *G06T 3/0093* (2013.01); *G06T 5/005* (2013.01); *G06T 7/55* (2017.01);
(Continued)

(58) Field of Classification Search
CPC .... G06T 5/50; G06T 7/80; G06T 7/55; G06T 3/0093; G06T 5/005; G06T 2207/10016;
(Continued)

(56) References Cited

U.S. PATENT DOCUMENTS 8,106,924 B2 * 1/2012 Aliprandi ............. H04N 13/111
345/629
8,619,082 B1 * 12/2013 Ciurea .................... G06T 7/85
345/427
(Continued)

FOREIGN PATENT DOCUMENTS

| CN | 103237155 A | 8/2013 |
|---|---|---|
| CN | 104661013 A | 5/2015 |
| CN | 105719317 A | 6/2016 |

OTHER PUBLICATIONS

PCT International Search Report and the Written Opinion dated Sep. 12, 2019, issued in related International Application No. PCT/CN2019/091346 (6 pages).

*Primary Examiner* — Gregory M Desire
(74) *Attorney, Agent, or Firm* — Sheppard Mullin Richter & Hampton LLP

(57) ABSTRACT

A method of image processing for occlusion removal in images and videos captured by light field camera systems. The method comprises: capturing a plurality of camera views using a plurality of cameras; capturing a plurality of depth maps using a plurality of depth sensors; generating a depth map for each camera view; calculating a target view on a focal plane corresponding to a virtual camera; set a weighting function on the pixels on the camera views based on the depth map and a virtual distance; and blending the pixels in accordance with the weighting function to generate a refocused target view.

8 Claims, 3 Drawing Sheets

Related U.S. Application Data is a continuation of application No. PCT/CN2018/083350, filed on Apr. 17, 2018, now abandoned.

(51) Int. Cl.
  *G06T 7/55* (2017.01)
  *G06T 3/00* (2006.01)
  *G06T 5/00* (2006.01)

(52) U.S. Cl.
  CPC ...... *G06T 7/80* (2017.01); *G06T 2207/10016* (2013.01); *G06T 2207/10024* (2013.01); *G06T 2207/10028* (2013.01); *G06T 2207/10052* (2013.01); *G06T 2207/20221* (2013.01); *G06T 2207/30232* (2013.01)

(58) Field of Classification Search
  CPC . G06T 2207/10024; G06T 2207/10028; G06T 2207/10052; G06T 2207/20221; G06T 2207/30232
  See application file for complete search history.

(56) References Cited

U.S. PATENT DOCUMENTS

| | | | |
|---|---|---|---|
| 9,648,346 B2* | 5/2017 | Zhang | H04N 19/54 |
| 2011/0267348 A1* | 11/2011 | Lin | G06T 15/20 |
| | | | 345/426 |
| 2012/0162193 A1 | 6/2012 | Bae et al. | |
| 2013/0127988 A1* | 5/2013 | Wang | H04N 13/264 |
| | | | 348/43 |
| 2014/0292748 A1 | 10/2014 | Ban et al. | |
| 2019/0139179 A1* | 5/2019 | Wang | G06T 5/002 |
| 2021/0042898 A1* | 2/2021 | Wu | G06T 5/005 |

\* cited by examiner

LIGHT FIELD SYSTEM OCCLUSION REMOVAL

CROSS-REFERENCE TO RELATED APPLICATIONS

This application is a continuation application of International Patent Application No. PCT/CN2019/091346, filed on Jun. 14, 2019, which is based on and claims the benefit of priority to International Application under Patent Cooperation Treaty, No. PCT/CN2018/083350, filed on Apr. 17, 2018. The above-referenced applications are incorporated herein by their entirety.

TECHNICAL FIELD

The present invention relates to image processing, and more particularly, to light field image processing for removing occlusion.

BACKGROUND

Over the last decades, intelligent video surveillance systems have becoming increasingly important due to the huge number of cameras used for security and surveillance in public areas. Directly monitoring the huge amount of information collected by human is impractical. Hence, reliable automatic processing of the collected video information is in high demand. Facial recognition is one of the advanced technologies that can be used to process such information, as it could be used to spot individual faces within a crowd and prevent crime in real-time. However, crowd occlusion is one of the issues that affects the accuracy of facial recognition.

For instance, in security surveillance, the capability of seeing a subject of interest through occluders can be crucial. However, refocusing technology alone often fails to adequately remove or blur an occluding object for sufficient identification and/or recognition of the occluded object at the full potential. In certain circumstances, this may determine whether a suspected terrorist or a dangerous criminal can be identified or not.

Therefore, there are needs in the field of light field image rendering for improved methods and systems to create more effective see-through effects.

SUMMARY

To address issues in the prior art, embodiments of the present invention provide a method of processing light field images for occlusion removal in images and videos captured by light field camera systems.

In accordance with an embodiment of the present invention, a method of image processing is provided, the method comprising: capturing a plurality of camera views using a plurality of cameras; generating a depth map for each camera view; calculating a target view on a focal plane corresponding to a virtual camera; projecting a pixel on the target view to the plurality of camera views to obtain a plurality of projected pixels; setting a weighting of a projected pixel to 0 if the depth value of the projected pixel on the first camera view is less than a virtual distance between the pixel on the target view and the corresponding camera, and to 1 if otherwise; and blending the projected pixels in accordance with the weightings to generate a refocused target view.

Preferably, the pixel on the target view comprises a color value or a grayscale value, and blending the projected pixel comprises calculating the color value or a grayscale value of the pixel on the target view by weighted averaging a color value or a grayscale value of the projected pixels on the plurality of camera views.

Preferably, the method further comprises capturing a plurality of depth maps using a plurality of depth sensors.

Preferably, generating a depth map for a camera view comprising warping a depth image captured by a depth sensor in accordance with intrinsic matrices and extrinsic matrices of the depth sensor and camera.

In accordance with an embodiment of the present invention, warping the depth image generated by a depth sensor according to a warping algorithm comprises forwarding warping the depth image generated by the depth sensor to obtain an intermediate depth image; filling holes in the intermediate depth image; and backward waring the intermediate depth image to obtain the depth map for the camera view.

In accordance with an embodiment of the present invention, the plurality of cameras are configured to capture a plurality of videos, and a refocused target video corresponding to the virtual camera is generated in real time.

Preferably, the plurality of video comprise 30 frames per second.

BRIEF DESCRIPTION OF THE DRAWINGS

To better illustrate the technical features of the embodiments of the present invention, various embodiments of the present invention will be briefly described in conjunction with the accompanying drawings.

DETAIL DESCRIPTION OF THE EMBODIMENTS

Figure 1:
FIG. 1 is an exemplary schematic diagram of a light field camera system with depth sensors in accordance with an embodiment of the present invention.

In accordance with embodiments of the present invention, a light field camera array system with wide baseline is introduced to remove occlusion in real-time. FIG. 1 is an exemplary schematic diagram of a light field camera system with depth sensors in accordance with an embodiment of the present invention. As shown in FIG. 1, the system contains several color image sensors and depth sensors. All of these sensors have a synchronous mechanism. The depth information can be generated by various depth sensors, such as Kinect and Realsense sensors. Alternatively, the 3D information can also be produced by a light field color image system by conducting stereo matching. Depth information is used for occlusion detection and occluded region in-painting. A 3D point cloud on the focal plane is generated.

Compared to traditional pin-hole camera system, photographs from multiple angles of light filed provide extra information to in-painting the occluded regions. The light field camera system allows us to see "around" the occluder by filling in unseen areas of the photograph. With the real-time light field render, this system can provide reliable occlusion-free footage for face recognition analysis. The occlusion removal mechanism is consisted in the following steps.

1. Camera System Calibration

Figure 2:
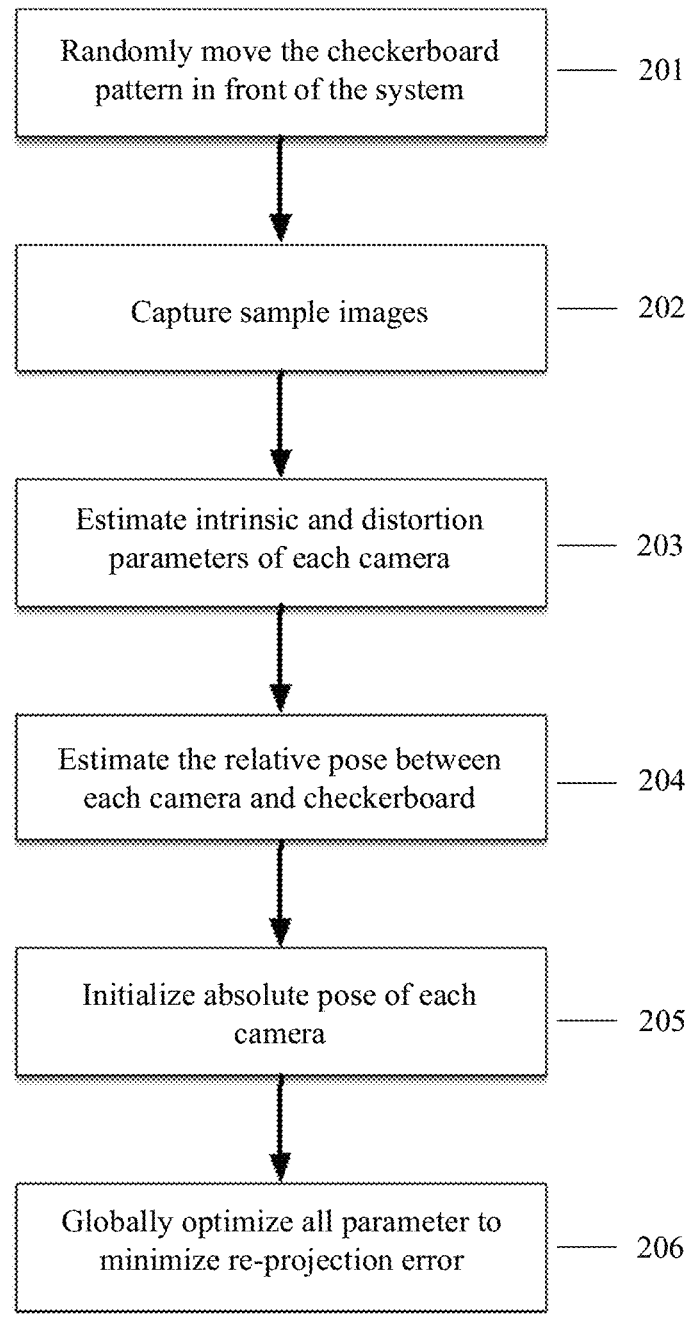
FIG. 2 is an exemplary schematic diagram for calibrating the camera system in accordance with another embodiment of the present invention.

First of all, we need to calibrate our camera system. We use traditional calibration methods to calibrate cameras and obtain their intrinsic and extrinsic matrices. FIG. 2 is an exemplary schematic diagram for calibrating the camera system in accordance with another embodiment of the present invention.

As shown in FIG. 2, in step 201, a checkerboard pattern is randomly moved in front of the camera system. In step 202, the system captures sample images. In step 203, the intrinsic and distortion parameters of each camera are estimated. In step 204, the relative pose between each camera and the checkerboard is estimated. In step 205, the absolute pose of each camera is initialized. Finally, in step 206, all parameters are globally optimized to minimize re-projection error.

2. Depth Maps and Color Images Capture

When the system is calibrated, we can start processing pipeline for each frame we captured. All color images and depth maps are captured synchronously, which ensures that all image from different sensors are captured at the same time.

3. Depth Projections

Next, we need to prepare depth maps for each viewpoint, which generate depth maps for all color images.

Depth images for each viewpoint can be obtained by warping the depth images from depth sensors according to the corresponding transformation between RGB cameras and depth sensors. The algorithm consists of three major components: a forward warping, a backward warping, and a hole filling process.

We do depth projection for each depth sensor. Here we demonstrate the warping algorithm for a single depth sensor. Let $d(x, y)$ be the depth image obtained from the depth sensor, $d_i(x_i, y_i)$ be the expected depth image of i-th viewpoint, $K_k$ and $K_i$ be the intrinsic matrices and $C_k$ and $C_i$ be the extrinsic matrices of depth sensor and i-th RGB camera respectively. We can formulate this relation as:

$$\begin{pmatrix} \omega_i x_i \\ \omega_i y_i \\ \omega_i d_i \\ \omega_i \end{pmatrix} = K_i C_i (K_k C_k)^{-1} \begin{pmatrix} \omega x \\ \omega y \\ \omega d \\ \omega \end{pmatrix} = T_i \begin{pmatrix} x \\ y \\ d \\ 1 \end{pmatrix} \quad (1)$$

By removing the third column and row of $T_i$, we obtain the forward warping equation given as:

$$\begin{pmatrix} \omega_i x_i \\ \omega_i y_i \\ \omega_i \end{pmatrix} = H_i \begin{pmatrix} x \\ y \\ 1 \end{pmatrix} + d\vec{a} \quad (2)$$

We can rewrite this equation as:

$$\begin{pmatrix} \omega_i x_i \\ \omega_i y_i \\ \omega_i \end{pmatrix} = H_i \begin{pmatrix} \omega_i^* x_i^* \\ \omega_i^* y_i^* \\ \omega_i^* \end{pmatrix} \quad (3)$$

with $\begin{pmatrix} \omega_i^* x_i^* \\ \omega_i^* y_i^* \\ \omega_i^* \end{pmatrix} = \begin{pmatrix} x \\ y \\ 1 \end{pmatrix} + d \cdot H_i^{-1} \vec{a}.$ (4)

Given the above formulations, we propose the following warping algorithm:

a. Forward warp the depth image d to obtain an intermediate depth image according to the equation (4);

b. Fill holes in the intermediate depth image; and c. Backward warp the intermediate depth image to obtain $d_i$ according to equation (3) (the depth image of the desired viewpoint)

Figure 3:
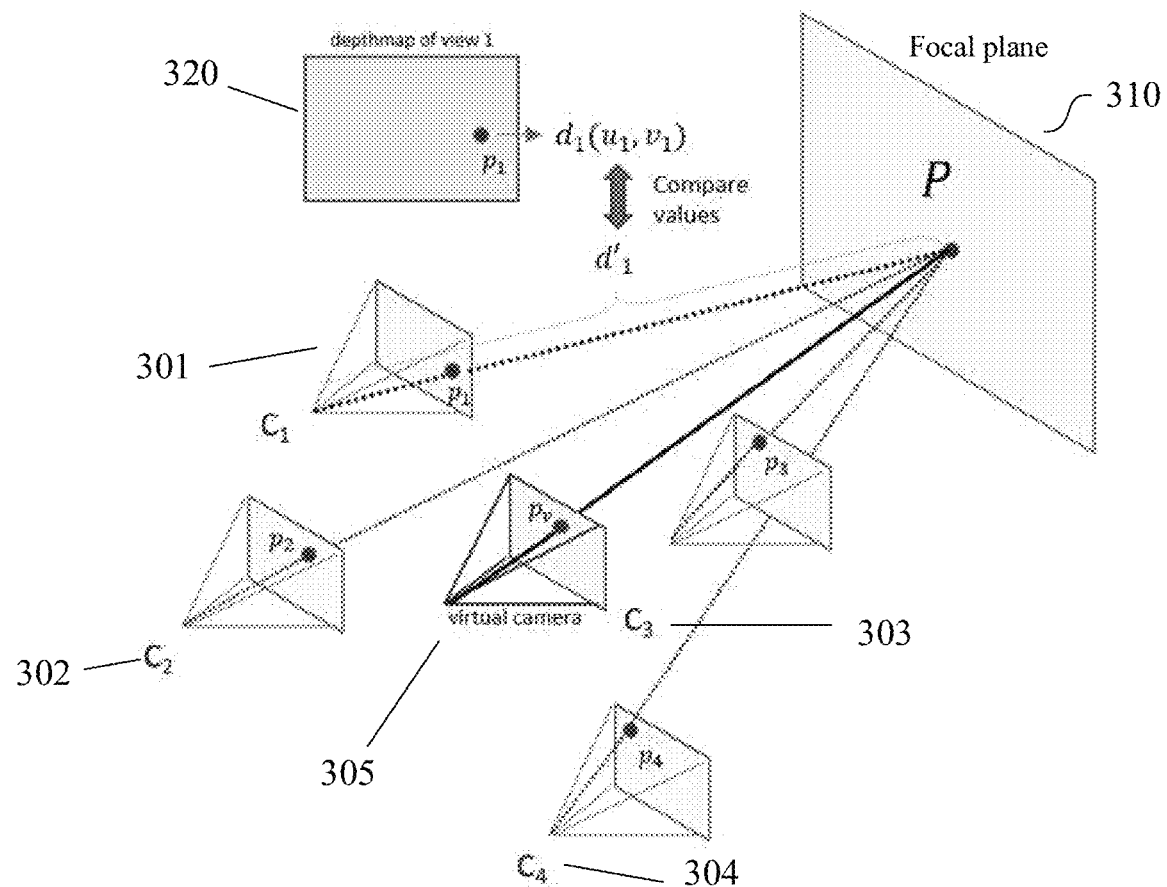
FIG. 3 is an exemplary schematic diagram showing the geometry indictors for the refocusing algorithm in accordance with yet another embodiment of the present invention.

FIG. 3 is an exemplary schematic diagram showing the geometry indictors for the refocusing algorithm in accordance with yet another embodiment of the present invention.

4. Occlusion Removal

Figure 4:
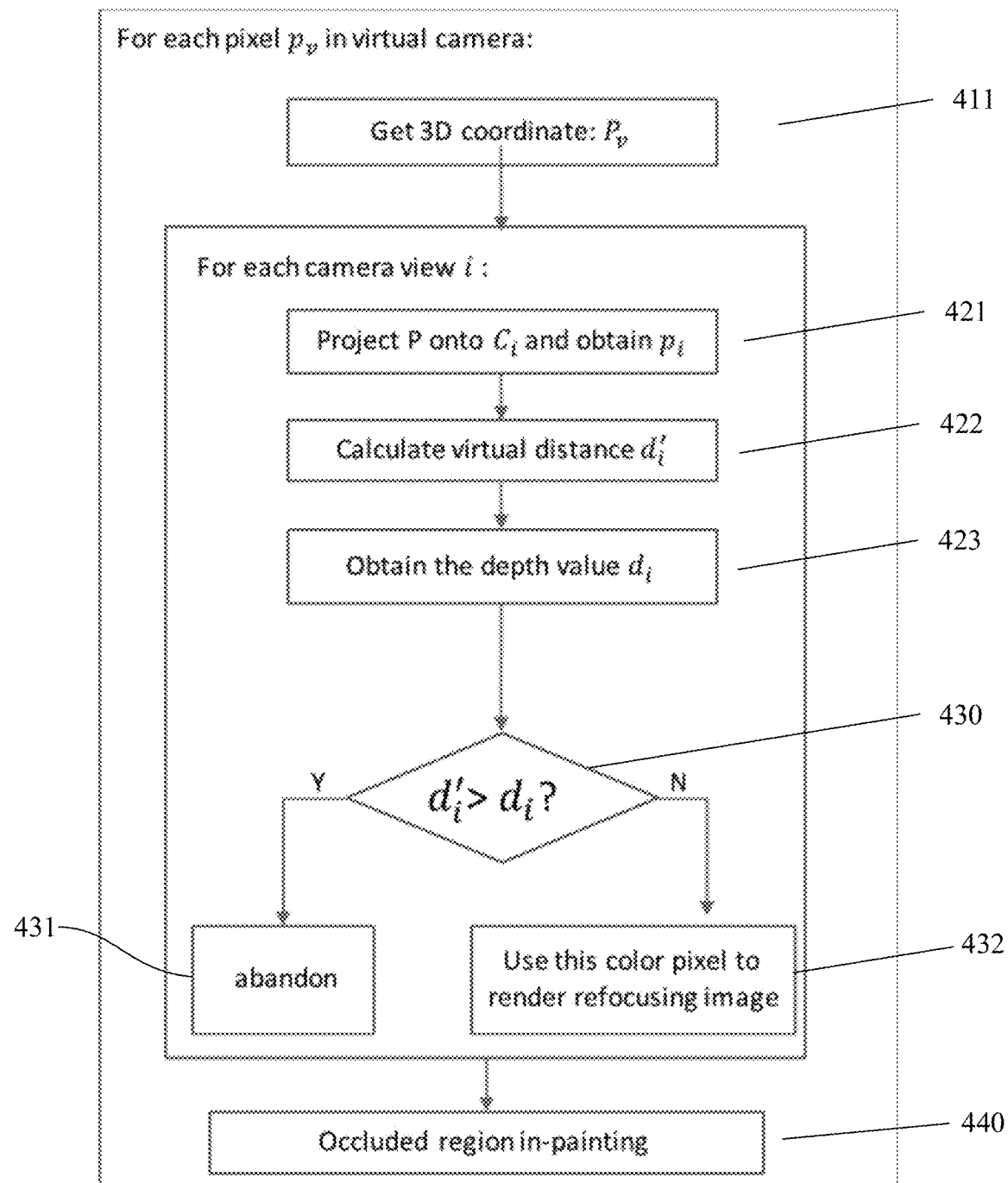
FIG. 4 an exemplary schematic diagram showing the occlusion removal algorithm in accordance with yet another embodiment of the present invention and two prior art techniques.

FIG. 4 an exemplary schematic diagram showing the occlusion removal algorithm in accordance with yet another embodiment of the present invention and two prior art techniques. For each pixel in virtual camera, the process shown in FIG. 4 is performed to remove occlusion.

4.1. Calculate 3D Point on the Focal Plane

Like traditional light field refocusing algorithm, we also have a focal plane which represents the estimated geometry of scene. Focal plane is located in virtual camera's coordinate system, and has a distance away from virtual camera.

4.1.1. Get 3D Coordinate

For each pixel of target view, we assume a planar proxy and apply ray tracing technique to calculate its 3D coordinate. The focal plane is perpendicular to the view direction of the target camera and the distance between them is z. Given a pixel $p_v=[u,v]^T$ in the target view, we calculate its 3D coordinate $P_v=[x_v,y_v,z_v]^T$ as $$\begin{pmatrix} x_v \\ y_v \\ z_v \end{pmatrix} = z K_v^{-1} \begin{pmatrix} u \\ v \\ 1 \end{pmatrix} \quad (5)$$

where $K_v$ is the intrinsic of the target camera.

4.2. Project 3D Point to Viewpoint 4.2.1 Project P onto $C_i$ and Obtain $p_i$

We then project the 3D point $P_v$ to all the captured views, from which we generate all the candidates for later pixel blending. Let $P_i=[x_i, y_i, z_i]^T$ and $p_i=[u_i, v_i]^T$ be the corresponding 3D coordinate and 2D pixel coordinate in the i-th viewpoint, $$\begin{pmatrix} x_i \\ y_i \\ z_i \end{pmatrix} = C_i C_v^{-1} \begin{pmatrix} x_v \\ y_v \\ z_v \end{pmatrix} \quad (6)$$

$$p_i = \begin{pmatrix} u_i \\ v_i \end{pmatrix} = \pi(K_i P_i) \quad (7)$$

where $\pi(\cdot)$ is the normalization operator to map the 3D homogeneous coordinate to the 2D pixel coordinate.

4.2.2. Calculate Virtual Distance $d_i'$

By taking the z coordinate from $P_i$, we obtain the z-depth $d_i'$ between the 3D point and the i-th camera.

$$d_i' = z_i \quad (8)$$

4.2.3. Obtain the Depth Value $d_i$

At the same time, we retrieve the warped depth value $d_i(u_i,v_i)$ and the color $c_i(u_i,v_i)$, which can be referred to section 3.

4.3. Occlusion Detection

We compare these two depth values. If $d_i(u_i,v_i) < d_i'$, we become confident that the expected object in the target view is occluded in the i-th viewpoint, therefore we abandon the pixel color from i-th viewpoint by setting the weighting $m_i$ to zero. Otherwise we accept the pixel color by setting the weighting $m_i$ to one.

4.4. Occluded Region in-Painting

The final pixel blending calculates the pixel color for $p_v$ $$c(u, v) = \frac{\Sigma_i m_i c_i(u_i, v_i)}{\Sigma_i m_i}$$

with this pixel selecting scheme, the refocused target image is guaranteed to avoid any obstructions in front of the focal plane.

After one frame is processed, we repeat these procedures above and obtain frames (video) with occlusions removed.

What is claimed is:

1. A method of image processing, comprising:
   Capturing, by a plurality of depth sensors, a plurality of depth images;
   capturing a plurality of camera views using a plurality of cameras;
   generating a depth map for each camera view of the plurality of camera views by:
     warping, in accordance with an intrinsic matrix of a corresponding depth sensor of the plurality of depth sensors, an intrinsic matrix of a corresponding camera of the plurality of cameras, an extrinsic matrix of the corresponding depth sensor of the plurality of depth sensors, and an extrinsic matrix of the corresponding camera of the plurality of cameras, a depth image of the plurality of depth images to obtain the depth map for each camera view;
   calculating a target view on a focal plane corresponding to a virtual camera;
   projecting a pixel on the target view to the plurality of camera views to obtain a plurality of projected pixels;
   setting a weighting of a projected pixel of the plurality of projected pixels to 0 if a depth value of the projected pixel on a first camera view of the plurality of camera views is less than a virtual distance between the pixel on the target view and the corresponding camera, and to 1 if otherwise; and
   blending the projected pixels in accordance with the weightings to generate a refocused target view.

2. The method of claim 1, wherein the pixel on the target view comprises a color value or a grayscale value,
   and blending the projected pixels in accordance with the weightings to generate the refocused target view comprises:
     calculating the color value or the grayscale value of the pixel on the target view by weighted averaging the color value or the grayscale value of the projected pixels on the plurality of camera views.

3. The method of claim 1, wherein warping a depth image of the plurality of depth images to obtain the depth map for each camera view comprises:
   forward warping the depth image to obtain an intermediate depth image;
   filling holes in the intermediate depth image; and
   backward warping the intermediate depth image to obtain the depth map for each camera view.

4. The method of claim 3, wherein forward warping the depth image to obtain an intermediate depth image comprises:
   forward warping the depth image to obtain the intermediate depth image in accordance with $$\begin{pmatrix} \omega_i^* x_i^* \\ \omega_i^* y_i^* \\ \omega_i^* \end{pmatrix} = \begin{pmatrix} x \\ y \\ 1 \end{pmatrix} + d \cdot H_i^{-1} \vec{a}.$$

wherein $$\begin{pmatrix} \omega_i^* x_i^* \\ \omega_i^* y_i^* \\ \omega_i^* \end{pmatrix}$$

is the intermediate depth image, and $$\begin{pmatrix} x \\ y \\ 1 \end{pmatrix}$$

is the depth map generated by the depth sensor.

5. The method of claim 4, further comprising:
   obtaining $H_i$ by removing the third row of $T_i$, wherein $T_i = K_i C_i (K_k C_k)^{-1}$, $K_k$ and $K_i$ are, respectively, the intrinsic matrix of the corresponding depth sensor of the plurality of depth sensors, and the intrinsic matrix of the corresponding camera of the plurality of cameras, and $C_k$ and $C_i$ are, respectively, the extrinsic matrix of the corresponding depth sensor of the plurality of depth sensors, and the extrinsic matrix the corresponding camera of the plurality of cameras.

6. The method of claim 4, wherein backward warping the intermediate depth image to obtain the depth map for each camera view comprises:
   backward warping the intermediate depth image to obtain the depth map for each camera view in accordance with $$\begin{pmatrix} \omega_i x_i \\ \omega_i y_i \\ \omega_i \end{pmatrix} = H_i \begin{pmatrix} \omega_i^* x_i^* \\ \omega_i^* y_i^* \\ \omega_i^* \end{pmatrix}$$

wherein $$\begin{pmatrix} \omega_i^* x_i^* \\ \omega_i^* y_i^* \\ \omega_i^* \end{pmatrix}$$

is the intermediate depth image, and $$\begin{pmatrix} \omega_i x_i \\ \omega_i y_i \\ \omega_i \end{pmatrix}$$

is the depth map for each camera view.

7. The method of claim 1, wherein the plurality of cameras are configured to capture a plurality of videos, and a refocused target video corresponding to the virtual camera is generated in real time.

8. The method of claim 7, wherein each of the plurality of videos comprises 30 frames per second.

* * * * *